a2
(12) United States Patent
Kurematsu (10) Patent No.: US 9,303,735 B2
(45) Date of Patent: Apr. 5, 2016

(54) CHAIN TENSIONER

(71) Applicant: TSUBAKIMOTO CHAIN CO., Osaka-shi, Osaka (JP)

(72) Inventor: Yuji Kurematsu, Osaka (JP)

(73) Assignee: TSUBAKIMOTO CHAIN CO., Osaki-shi (JP)

( * ) Notice: Subject to any disclaimer, the term of this patent is extended or adjusted under 35 U.S.C. 154(b) by 314 days.

(21) Appl. No.: 14/147,782

(22) Filed: Jan. 6, 2014

(65) Prior Publication Data

US 2014/0200104 A1 Jul. 17, 2014

(30) Foreign Application Priority Data

Jan. 11, 2013 (JP) ................................. 2013-003520

(51) Int. Cl.
*F16H 7/08* (2006.01)

(52) U.S. Cl.
CPC ................ *F16H 7/08* (2013.01); *F16H 7/0848* (2013.01); *F16H 2007/0806* (2013.01); *F16H 2007/0812* (2013.01); *F16H 2007/0859* (2013.01); *F16H 2007/0878* (2013.01); *F16H 2007/0891* (2013.01)

(58) Field of Classification Search
CPC . F16H 7/08; F16H 7/0848; F16H 2007/0816; F16H 2007/0812; F16H 2007/0859; F16H 2007/0878; F16H 2007/0891

USPC .................................................. 474/110, 111
See application file for complete search history.

(56) References Cited

U.S. PATENT DOCUMENTS

| 5,879,256 A | * | 3/1999 | Tada .............................. 474/110 |
| 5,908,363 A | * | 6/1999 | Suzuki .......................... 474/101 |
| 7,918,754 B2 | * | 4/2011 | Kurematsu ..................... 474/110 |
| 2013/0331212 A1 | * | 12/2013 | Kurematsu et al. ........... 474/110 |

FOREIGN PATENT DOCUMENTS

| GB | 2308420 A | * 10/1996 | ................ F16H 7/08 |
| JP | 09-177907 A | 7/1997 | |
| JP | 2009-002495 A | 1/2009 | |
| JP | 4376278 B2 | 12/2009 | |

* cited by examiner

*Primary Examiner* — William E Dondero
*Assistant Examiner* — Robert T Reese
(74) *Attorney, Agent, or Firm* — Westerman, Hattori, Daniels & Adrian, LLP (57) ABSTRACT

To provide a chain tensioner that has a simple structure, is universally usable, is capable of supplying sufficient and necessary oil when restarted after a long time after the stop of oil supply, enables reduction in entire length and size, and enables easy production and reduction in production cost. An urging unit 140 provided in an oil pressure chamber 101 to be expandable and contractible urges a plunger 120 outward from a plunger bore 111 in a tensioner body 110 of the chain tensioner 100. The plunger 120 includes a plunger body 126, a check valve 150 provided inside the body, and a reserve tube 130 that has an oil reservoir chamber 123 communicating with the oil pressure chamber 101 through an oil hole 132.

9 Claims, 10 Drawing Sheets

Related Art

CHAIN TENSIONER

BACKGROUND OF THE INVENTION

1. Field of the Invention

The present invention relates to a chain tensioner that includes a tensioner body having a cylindrical plunger bore with an open end, a cylindrical plunger slidable within the plunger bore, and an urging unit accommodated inside an oil pressure chamber formed between the plunger bore and the rear end of the plunger such as to be able to expand and contract and to urge the plunger outward, the chain tensioner being capable of maintaining suitable tension of a chain.

2. Description of the Related Art

Chain tensioners are commonly used for maintaining suitable tension of chains. In a chain guide mechanism that slidably guides a transmission chain such as an endless roller chain passing over respective sprockets of a crankshaft and a cam shaft inside an engine room with a guide shoe, for example, it is known to urge a pivoting chain guide having the guide shoe with a chain tensioner to maintain suitable tension.

Figure 16:
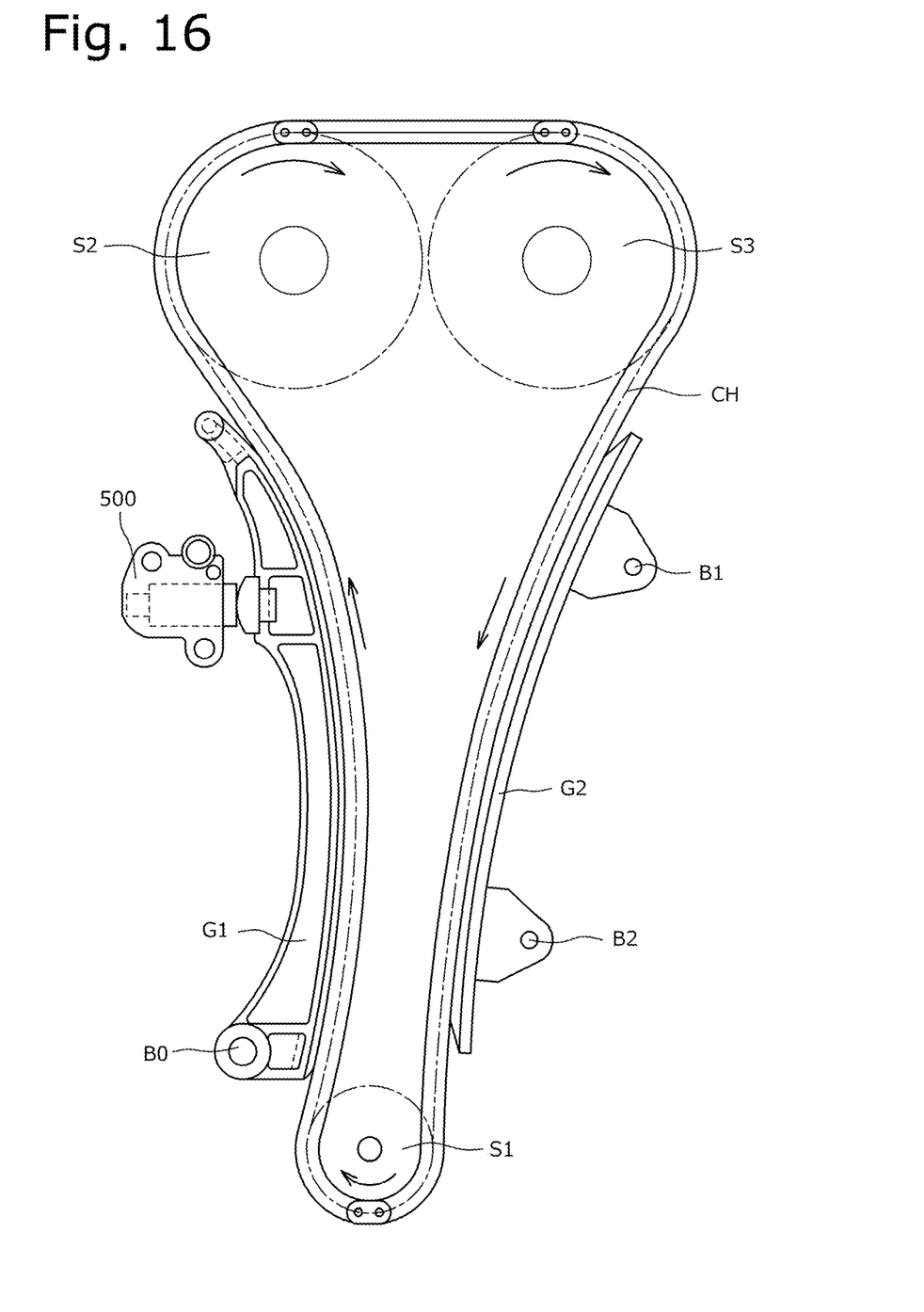
FIG. 16 is a diagram illustrating the chain tensioner used in a chain guide mechanism of an engine.

For example, as shown in FIG. 16, an endless timing chain CH passes over a drive sprocket S1 attached to a crankshaft and a pair of driven sprockets S2 and S3 attached to cam shafts in an engine room. A chain guide mechanism has a pivoting chain guide G1 and a stationary chain guide G2 for guiding this timing chain CH.

The stationary chain guide G2 is fixed in position in the engine room with two mounting shafts B1 and B2, while the pivoting chain guide G1 is attached in the engine room such as to be pivotable around the mounting shaft BO in the plane in which the timing chain CH runs.

The chain tensioner 500 maintains the tension of the timing chain CH at a suitable level as well as reduces its vibration by pressing the pivoting chain guide G1.

Figure 17:
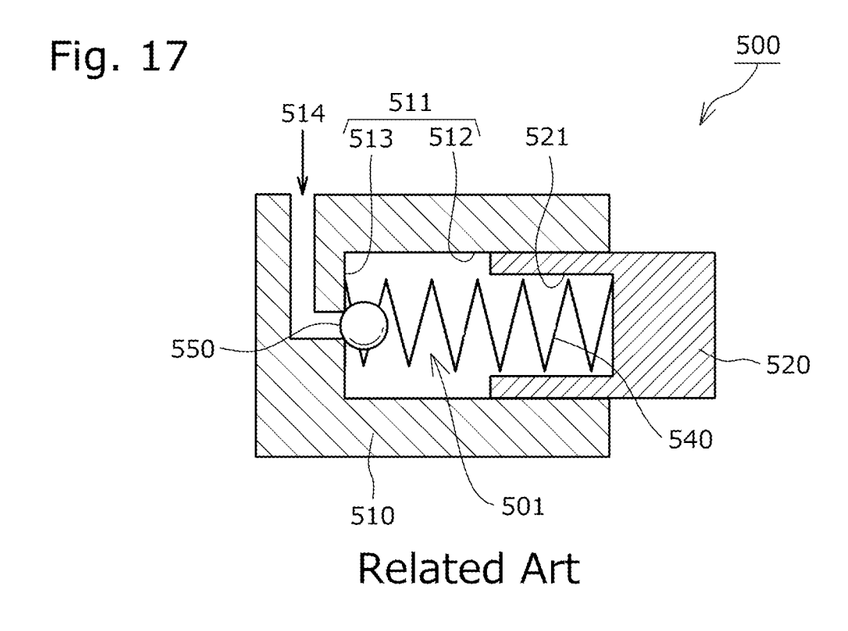
FIG. 17 is a schematic diagram illustrating a conventional chain tensioner.

The known chain tensioner 500 used in such a chain guide mechanism includes, for example, as shown schematically in FIG. 17, a tensioner body 510 having a cylindrical plunger bore 511 with an open end, a cylindrical plunger 520 in the plunger bore 511 to slide against the cylindrical surface 513 of the plunger bore 511, and urging means that urges the plunger 520 outward from the plunger bore 511.

The urging means is a coil spring 540 accommodated inside a cylindrical recess 521 in the cylindrical plunger 520 and compressed between the plunger and the bottom 512 of the plunger bore 511.

Oil is supplied from an oil supply hole 514 formed in the plunger bore 511, so that an oil pressure chamber 501 formed between the plunger bore 511 and the plunger 520 is filled with oil, which oil urges the plunger 520 outward. A check valve 550 (schematically shown as a check ball) stops the oil from flowing out from the oil supply hole 514.

As the plunger 520 reciprocates, oil flows through the small gap between the plunger 520 and the plunger bore 511, and the flow resistance provides the damping effect of slowing down the reciprocal movement of the plunger 520.

In such a known chain tensioner 500, when let stand for a long time after the oil supply is stopped (in the case with an engine, after the engine is stopped), there is a time lag before oil is supplied immediately after the next start-up, and as no oil is replenished but the oil in the oil pressure chamber 501 leaks out when the plunger 520 moves back and forth, there occurs a shortage of oil in the oil pressure chamber 501. Because of this shortage of oil, the damping force of the oil does not act on the plunger 520, which may sometimes lead to vibration and abnormal noise of the timing chain C, or damage the timing chain C.

It is also known to provide an oil reservoir chamber inside the plunger configured to supply oil into the oil pressure chamber (see Japanese Patent Application Laid-open No. H09-177907 and Japanese Patent Publication No. 4376278). A constant amount of oil is retained in the oil reservoir chamber, so that, even immediately after the start-up after a long non-use time, oil remaining in the oil reservoir chamber is supplied to the oil pressure chamber, to maintain the damping force of oil for the plunger and to prevent vibration or damage of the chain.

With the technique described in Japanese Patent Application Laid-open No. H09-177907, however, most of the oil supplied from the oil reservoir chamber (oil reserve chamber 9) into the oil pressure chamber (high pressure chamber 14) leaks out from the oil pressure chamber (high pressure chamber 14) through the gap between the plunger and the plunger bore (plunger chamber 4) as the plunger reciprocates immediately after the start-up, and leaks out from the oil supply hole (supply hole 12) or from the distal end of the plunger, so that the amount of oil in the oil reservoir chamber (oil reserve chamber 9) is reduced.

It is therefore necessary for the oil reservoir chamber (oil reserve chamber 9) to have a large capacity so as to keep enough oil inside during the time lag before oil is supplied from the oil supply hole (supply hole 12) immediately after the start-up, because of which the entire tensioner could not be made shorter and could hardly be made smaller.

With the technique described in Japanese Patent Publication No. 4376278, the oil supply hole (oil supply hole 122) is arranged in an upper part and oriented diagonally forward so that at least the oil that has leaked from the oil pressure chamber (high pressure oil chamber R) through the gap between the plunger and the plunger bore is prevented from leaking through the oil supply hole (oil supply hole 122) to the outside.

However, this configuration cannot be applied to a design in which oil is supplied laterally. Universal use of the tensioner was difficult because of the restrictions on the position of the oil supply hole (oil supply hole 122) or mounting orientation of the chain tensioner.

As the oil inevitably leaks out from the distal end of the plunger, the tensioner needs to have an oil reservoir chamber with a large volume as with the technique described in Japanese Patent Application Laid-open No. H09-177907, because of which the entire tensioner could not be made shorter and could hardly be made smaller.

Another problem was that the plunger structure was made complex because of the anti-rotation mechanism that was essential to stop rotation of the plunger.

The plunger features such as the oil reservoir chamber and oil supply hole in the known technologies of Japanese Patent Application Laid-open No. H09-177907 or Japanese Patent Publication No. 4376278 were formed by machining a one-piece plunger. The production process was therefore complex because the plunger needed machining in many parts, and also the cost was increased because of material limitations.

SUMMARY OF THE INVENTION

The present invention is directed to solve these problems, and aims to provide a chain tensioner that has a simple structure, is universally usable, is capable of supplying sufficient and necessary oil when restarted after a long time after the stop of oil supply, enables reduction in entire length and size, and enables easy production and reduction in production cost.

The present invention solves the problems described above by providing a chain tensioner including: a tensioner body having a cylindrical plunger bore with an open end; a cylindrical plunger slidable within the plunger bore; and an urging unit accommodated inside an oil pressure chamber formed between the plunger bore and a rear end of the plunger such as to be able to expand and contract and to urge the plunger outward, the plunger including a plunger body, a check valve and a reserve tube provided inside the plunger body, the reserve tube having an oil hole formed on the check valve side and an oil reservoir chamber communicating with the oil pressure chamber through the oil hole.

With the chain tensioner according to claim 1, a check valve and a reserve tube are provided inside the plunger body, and the reserve tube has an oil hole on the check valve side and an oil reservoir chamber that communicates with an oil pressure chamber through the oil hole. As the reserve tube functions as a stationary seat for the check valve, the plunger body can have a simple internal shape. The need of complex machining is thus obviated and a large space is formed for the oil reservoir chamber.

This way, sufficient and necessary oil can be supplied when restarted after a long time after the stop of oil supply, the production is made easy and the production cost is reduced, and the entire length and size of the tensioner are reduced.

With the structure as set forth in claim 2, oil supplied from the oil supply hole flows from the supply chamber and through the internal supply cavity on the outer circumference of the reserve tube, and reaches the oil pressure chamber through an oil communication notch formed at the distal end in the outward direction of the plunger of the reserve tube. Therefore, the amount of oil that remains in the oil reservoir chamber can be increased irrespective of the position of the oil supply hole or the mounting orientation of the chain tensioner itself, or of the rotational position of the plunger.

This way, sufficient and necessary oil can be supplied when restarted after a long time after the stop of oil supply, as well as the plunger structure is simplified, as the need of the mechanism for stopping rotation of the plunger is obviated.

With the structure as set forth in claim 3, as an outer leak groove is formed in the outer circumferential surface of the plunger body on the oil pressure chamber side such as to extend from the oil pressure chamber to the supply chamber, when the plunger reciprocates immediately after the start-up after being stopped for a long time, oil is supplied from the oil reservoir chamber to the oil pressure chamber via the check valve, wherein most of the oil in the oil pressure chamber passes through the outer leak groove, and is recovered into the oil reservoir chamber through the supply chamber, plunger hole, internal supply cavity, and oil communication notch.

Therefore, the amount of oil leaking to the outside from the distal end of the plunger through the gap between the plunger and the plunger bore is reduced irrespective of the position of the oil supply hole or the mounting orientation of the chain tensioner itself, so that much more oil can be recovered into the oil reservoir chamber from the plunger hole that opens to the supply chamber.

Therefore, even though there is little oil left in the oil reservoir chamber after the stop of oil supply, a sufficient and necessary amount of oil can be secured for the next start-up by reducing the amount of oil leaking outside and by circulating and recovering the oil from the oil pressure chamber into the oil reservoir chamber, which enables the oil reservoir chamber to have a smaller space, and the entire tensioner to be shorter and smaller.

The chain tensioner is more universally usable, as less oil leaks outside and more oil is recovered into the oil reservoir chamber irrespective of the position of the oil supply hole or the mounting orientation of the chain tensioner itself.

With the structure as set forth in claim 4, as the outer leak groove is located at a circumferentially same phase position as the plunger hole, more of the oil leaking through the outer leak groove into the supply chamber flows directly toward the plunger hole with the reciprocation of the plunger, so that more oil is recovered into the oil reservoir chamber through the plunger hole, internal supply cavity, and oil communication notch instead of leaking to the outside.

With the structure as set forth in claim 5, as an inner leak groove is formed in the outer circumferential surface of the reserve tube on the check valve side such as to extend from the oil pressure chamber to the internal supply cavity, when the plunger reciprocates, oil is supplied from the oil reservoir chamber to the oil pressure chamber via the check valve, and the oil in the oil pressure chamber is directly recovered into the oil reservoir chamber through the inner leak groove.

Therefore, the amount of oil leaking to the outside from the distal end of the plunger through the gap between the plunger and the plunger bore is further reduced irrespective of the position of the oil supply hole or the mounting orientation of the chain tensioner itself, or irrespective of the rotational position of the plunger, so that much more oil can be recovered into the oil reservoir chamber.

With the structure as set forth in claim 6, as a contact surface leak groove is formed in at least one of the opposite surfaces of the reserve tube and the check valve such as to extend from the oil pressure chamber to the oil reservoir chamber, when the plunger reciprocates, oil is supplied from the oil reservoir chamber to the oil pressure chamber via the check valve, and the oil in the oil pressure chamber is directly recovered into the oil reservoir chamber through the contact surface leak groove.

Therefore, the amount of oil leaking to the outside from the distal end of the plunger through the gap between the plunger and the plunger bore is further reduced irrespective of the position of the oil supply hole or the mounting orientation of the chain tensioner itself, or of the rotational position of the plunger, so that much more oil can be recovered into the oil reservoir chamber.

The distance of the contact surface leak groove can be made longer as appropriate, so that the flow resistance can be set in a wider range as required.

With the structure as set forth in claim 7, the other end of the coil spring is seated in the plunger body, so that there is no need to provide a long space for the oil pressure chamber in the plunger bore to accommodate the coil spring, and the entire tensioner can be made shorter and smaller.

With the structure as set forth in claim 8, the other end of the coil spring is seated on the outer flange of the retainer in the plunger body, so that the check valve can be disposed inside the coil spring. As there is no need to provide a long space for the oil pressure chamber in the plunger bore, the entire tensioner can be made shorter and smaller.

With the structure as set forth in claim 9, one surface on the check valve side of the reserve tube functions also as the ball seat of the check valve. As the structure is further simplified, production is easier and the production cost can be reduced.

With the structure as set forth in claim 10, one end of the coil spring seated on the bottom of the plunger bore is restricted from moving sideways by the tapered surface, so that looseness or displacement of the coil spring in the lateral direction inside the oil pressure chamber or the cylindrical recess can be prevented to allow smooth reciprocation of the plunger. Also, as the tensioner requires less space for allowing lateral displacement, it can be made shorter and smaller.

DESCRIPTION OF THE PREFERRED EMBODIMENTS

The chain tensioner of the present invention may be embodied in any specific form as long as: it includes a tensioner body having a cylindrical plunger bore with an open end, a cylindrical plunger slidable within the plunger bore, and an urging unit accommodated inside an oil pressure chamber formed between the plunger bore and a rear end of the plunger such as to be able to expand and contract and to urge the plunger outward, the plunger including a plunger body, a check valve and a reserve tube provided inside the plunger body, the reserve tube having an oil hole formed on the check valve side and an oil reservoir chamber communicating with the oil pressure chamber through the oil hole; and as long as it has a simple structure, is universally usable and capable of supplying sufficient and necessary oil when restarted after a long time after the stop of oil supply, enables reduction of its entire length and size, and enables easy production and reduction of production cost.

For example, the reserve tube may be made of any material, preferably aluminum or resin so as to reduce the overall weight, inertial mass of the plunger, and production cost.

Since the inside shape of the plunger body is simplified, it may be made by press-forming or the like from a metal sheet blank.

<Embodiment 1>

A chain tensioner 100 according to a first embodiment of the present invention will be described with reference to the drawings.

The chain tensioner 100 according to a first embodiment of the present invention includes, as shown in FIG. 1 to FIG. 8, a tensioner body 110 having a cylindrical plunger bore 111 with an open end, a cylindrical plunger 120 slidable within the plunger bore 111, and a coil spring 140 that is an urging unit accommodated inside an oil pressure chamber 101 formed between the plunger bore 111 and the rear end of the plunger 120 such as to be able to expand and contract and to urge the plunger 120 outward.

The chain tensioner 100 according to this embodiment is securely mounted inside an engine having a chain guide mechanism. For this purpose, the tensioner body 110 has mounting parts 116 with mounting holes 117 for bolts or the like to pass through as shown in FIG. 1 to FIG. 6.

Figure 5:
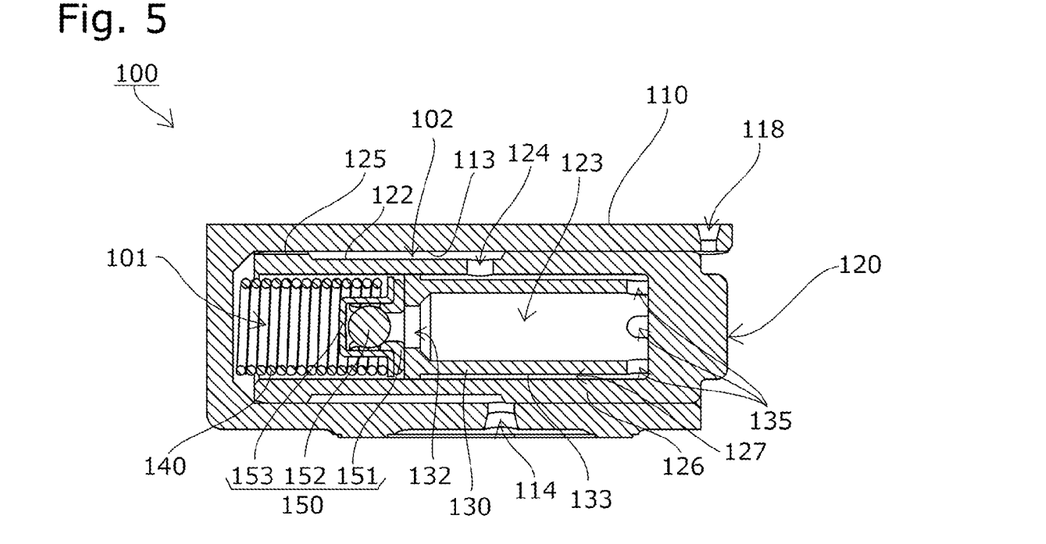
FIG. 5 is a cross-sectional view along A-A of FIG. 1.
Figure 6:
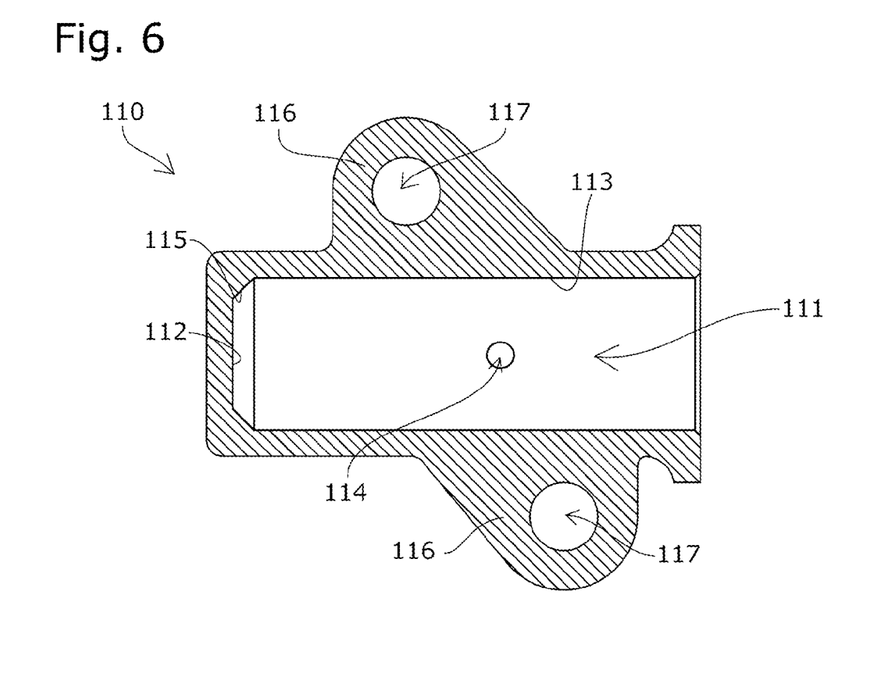
FIG. 6 is a cross-sectional view of only the tensioner body of FIG. 4.
Figure 7:
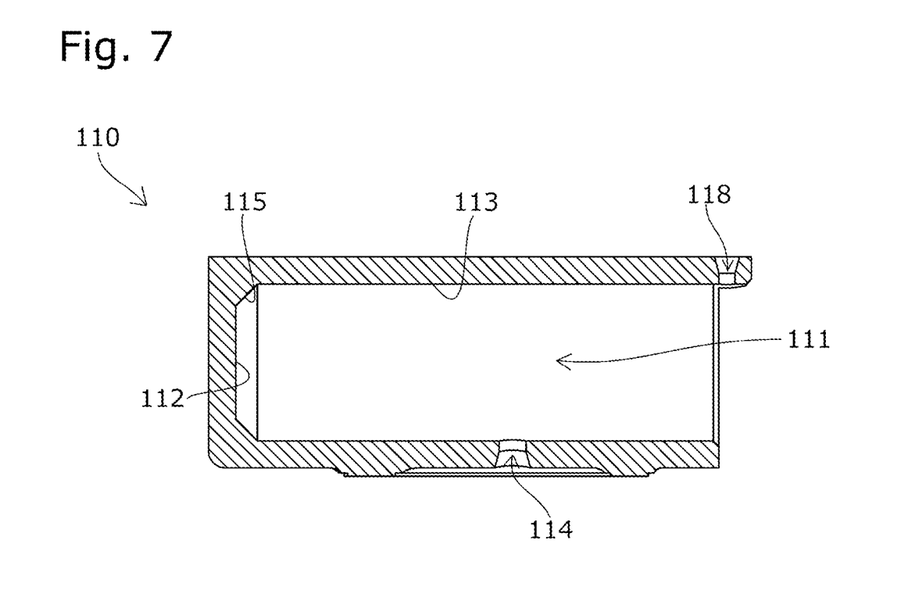
FIG. 7 is a cross-sectional view of only the tensioner body of FIG. 5.

An oil supply hole 114 is formed in the cylindrical surface 113 of the plunger bore 111 of the tensioner body 110 as shown in FIG. 5 to FIG. 7, which opens to outside so that oil can be supplied.

Figure 1:
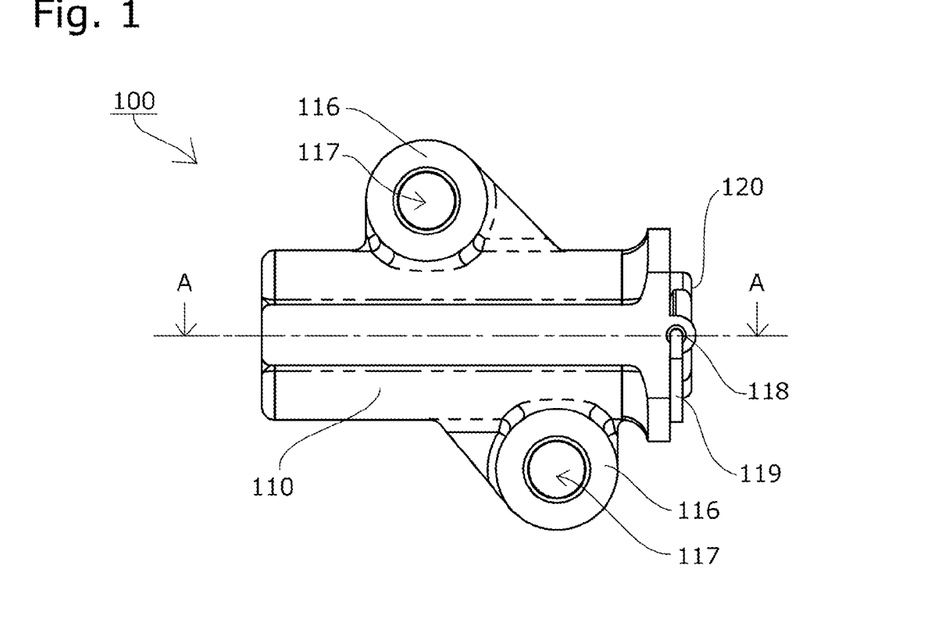
FIG. 1 is a front view of a chain tensioner according to a first embodiment of the present invention.
Figure 2:
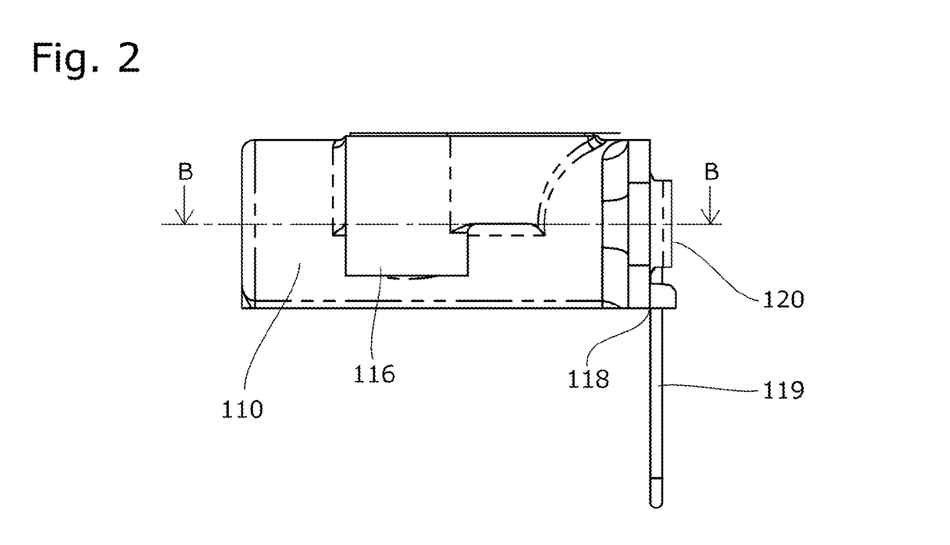
FIG. 2 is a plan view of the chain tensioner according to the first embodiment of the present invention.
Figure 3:
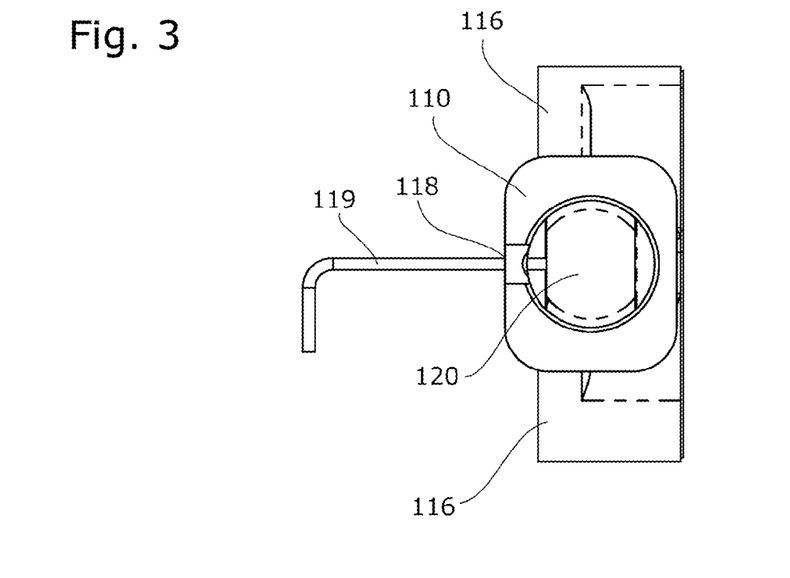
FIG. 3 is a side view of the chain tensioner on one side where a plunger protrudes according to the first embodiment of the present invention.

Near the opening of the plunger bore 111 is formed a pin hole 118 that radially extends through, so that, with a retainer pin 119 inserted in the pin hole 118 as shown in FIG. 1 to FIG. 3, the plunger 120 can be fixed in its retracted position, to enable mounting of the tensioner including the plunger 120 assembled therein in the engine or any other such work.

Figure 4:
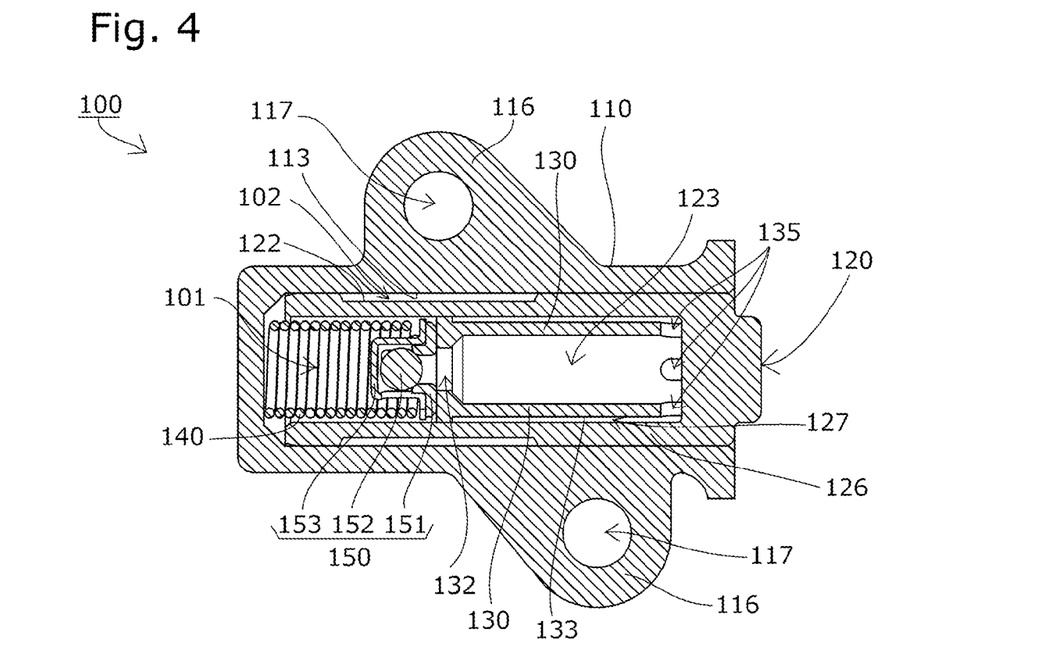
FIG. 4 is a cross-sectional view along B-B of FIG. 2.

The plunger 120 includes a plunger body 126, and a check valve 150 and a reserve tube 130 provided inside the plunger body 126, as shown in FIG. 4 and FIG. 5.

Figure 8:
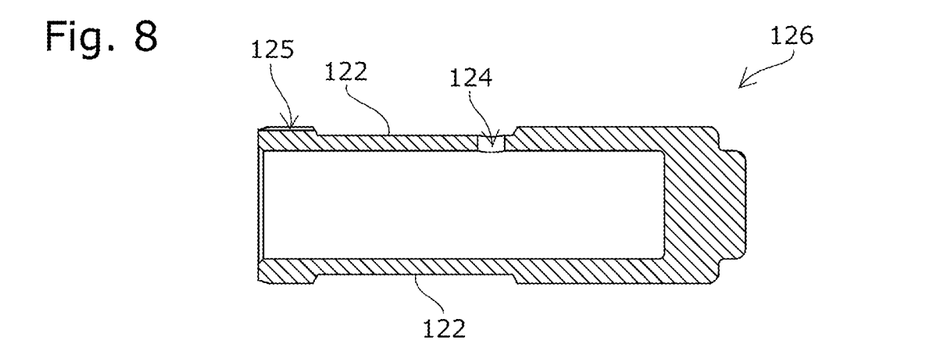
FIG. 8 is a cross-sectional view of only the plunger body of FIG. 4.

A connection/adjustment groove 122 is formed in the outer circumference of the plunger body 126, which forms a supply chamber 102 between itself and the cylindrical surface 113 of the plunger bore 111 as shown in FIG. 4, FIG. 5, and FIG. 8, and an outer leak groove 125 is provided in the outer circumference on the side of the oil pressure chamber 101 to extend from the oil pressure chamber 101 to the supply chamber 102.

Inside the plunger body 126 is arranged the reserve tube 130 having the oil reservoir chamber 123 on the side to which the plunger moves out, with the check valve 150 arranged on the oil pressure chamber 101 side of the reserve tube 130.

Figure 9:
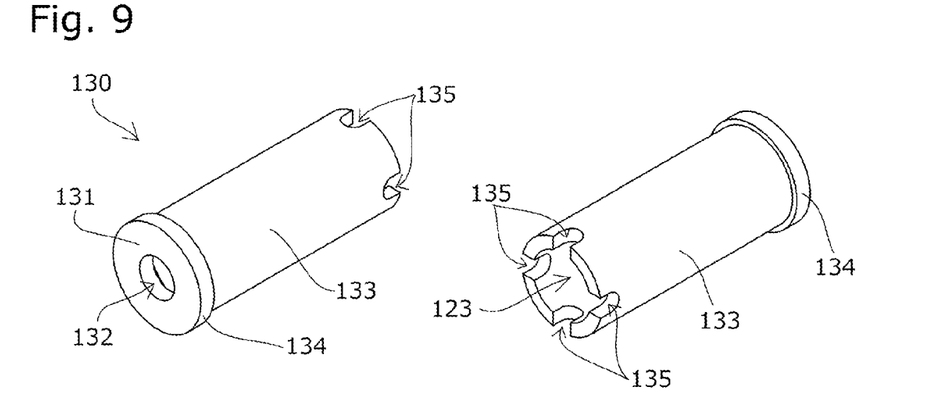
FIG. 9 is a perspective view of a reserve tube of the chain tensioner according to the first embodiment of the present invention.

The reserve tube 130 has a space inside that forms the oil reservoir chamber 123, and a small-diameter part 133 to form an internal supply cavity 127 between itself and the inner circumference of the plunger body 126, with oil communication notches 135 formed at the distal end in the outward direction of the plunger for supplying oil from the internal supply cavity 127 to the oil reservoir chamber 123, as shown in FIG. 4, FIG. 5, and FIG. 9.

One end having an end face 131 on the check valve 150 side is formed as a large-diameter part 134 that snugly fits with the inner circumference of the plunger body 126. The oil reservoir chamber 123 communicates with the check valve 150 through an oil hole 132 provided in the end face 131.

The check valve 150 includes, as shown in FIG. 4 and FIG. 5, a ball seat 151 seated on the end face 131 of the reserve tube 130, a check ball 152 that can make sealing contact with the oil passage in the ball seat 151, and a retainer 153 that guides the check ball 152.

The urging unit accommodated inside the oil pressure chamber 101 such as to be able to expand and contract and to urge the plunger 120 outward is a coil spring 140, which is seated at one end on the bottom 112 of the plunger bore 111 and at the other end inside the plunger body 126 as shown in FIG. 4 to FIG. 7.

The other end of the coil spring 140 reaches the end face 131 of the reserve tube 130 via the outer circumference of the retainer 153 of the check valve 150 so as to efficiently use the depth of the inside of the plunger body 126 as the space for the coil spring 140 to expand and contract.

The bottom 112 of the plunger bore 111 is formed as a circular flat surface having the same diameter as that of the coil spring 140. A tapered surface 115 connects the bottom 112 with the cylindrical surface 113 which makes sliding contact with the plunger 120.

One end of the coil spring 140 seated on the bottom 112 is restricted by the tapered surface 115 from moving sideways to prevent looseness or displacement, so that the plunger 120 can reciprocate smoothly.

The tensioner body 110 is attached to a mounting wall portion (not shown) inside the engine that is present on the upper side in FIG. 2 or on the right side in FIG. 3, and the oil supply hole 114 is oriented toward the mounting wall portion.

The connection/adjustment groove 122 of the plunger body 126 extends all around the outer surface so that the supply chamber 102 formed between the groove and the cylindrical surface 113 of the plunger bore 111 is tubular.

The plunger hole 124 that communicates the internal supply cavity 127 inside the plunger body 126 with the supply chamber 102 is oriented 180° opposite from the oil supply hole 114 in the cylindrical surface 113 of the plunger bore 111.

The oil communication notches 135 that communicate the oil reservoir chamber 123 with the internal supply cavity 127 are provided at the distal end of the outward direction of the plunger.

The outer leak groove 125 in the outer circumference of the plunger body 126 on the oil pressure chamber 101 side is located at the same phase position as that of the plunger hole 124 as shown in FIG. 5.

How the chain tensioner 100 according to the first embodiment of the present invention configured as described above operates will be explained.

During normal operation, oil is constantly supplied from oil supply means provided in the mounting wall portion (not shown) through the oil supply hole 114 so that the supply chamber 102 is always filled with oil.

The oil in the supply chamber 102 is fed into the oil reservoir chamber 123 through the plunger hole 124, the internal supply cavity 127 and the oil communication notches 135 so that the oil reservoir chamber 123 is also always filled with oil.

The check valve 150 allows the oil to flow in the direction from the oil reservoir chamber 123 into the oil pressure chamber 101. The oil in the oil reservoir chamber 123 is therefore supplied into the oil pressure chamber 101 through the check valve 150, so that the oil pressure chamber 101 is also always filled with oil.

Thus, the plunger 120 is urged outward also by the pressure of oil being supplied from the oil supply means provided in the mounting wall portion (not shown), in addition to the force from the coil spring 140.

When the plunger 120 is pushed inward, the check valve 150 closes, so that oil flows from the oil pressure chamber 101 into the supply chamber 102 through the gap between the plunger 120 and the cylindrical surface 113 of the plunger bore 111. The flow resistance at this time provides a dampening effect whereby the movement of the plunger 120 is dampened.

Next, how the tensioner operates immediately after the start-up after being left a long time after the stop of oil supply (in the case with an engine, after the engine was stopped) will be described.

Since there is a time lag before oil is supplied immediately after the start-up, no oil is supplied to the supply chamber 102 through the oil supply hole 114 for a while, so that the tensioner has to operate only with the oil remaining in the oil pressure chamber 101 and the oil reservoir chamber 123.

When the plunger 120 is pushed inward, as compared to when there is no outer leak groove 125, oil can flow from the oil pressure chamber 101 quickly into the supply chamber 102 through the gap between the plunger body 126 and the cylindrical surface 113 of the plunger bore 111 because of the outer leak groove 125 where the flow resistance is somewhat lower.

On the other hand, in the gap between the plunger body 126 and the cylindrical surface 113 of the plunger bore 111 closer to the distal end than the supply chamber 102, the flow resistance is much higher than in the outer leak groove 125, so that most of the oil in the supply chamber 102 does not leak out from the distal end but is recovered through the plunger hole 124, the internal supply cavity 127 and the oil communication notches 135 into the oil reservoir chamber 123.

The amount of oil leaking to the outside is thus reduced, so that the oil reservoir chamber 123 can have a smaller capacity to hold a sufficient and necessary amount of oil during the time lag before oil is supplied at the restart.

Some of the oil leaking out from the oil pressure chamber 101 into the supply chamber 102 flows out to the oil supply means through the oil supply hole 114. However, since the oil supply means side of the oil supply hole 114 is a sealed space, no large amount of oil flows out there. Therefore, by restricting the amount of oil leaking out from the distal end, a sufficient amount of oil can be recovered from the plunger hole 124 into the oil reservoir chamber 123.

In this embodiment, the plunger hole 124 and the outer leak groove 125 are located at the same circumferential phase position, while the oil supply hole 114 is located at a circumferentially different phase position from the plunger hole 124.

Therefore, more oil can be directed to the plunger hole 124 as it flows into the supply chamber 102 through the outer leak groove 125, and, since the oil path from the leak groove to the oil supply hole 114 is long, less oil flows out from the oil supply hole 114, so that more oil can be recovered from the plunger hole 124 through the internal supply cavity 127 and the oil communication notches 135 into the oil reservoir chamber 123.

Since the plunger hole 124 is provided around the midpoint of the plunger body 126, and the oil communication notches 135 are located at the distal end inside the plunger body 126, with the internal supply cavity 127 therebetween, oil leaks out less from the oil reservoir chamber 123 even after the supply of oil has stopped (in the case with an engine, after the engine was stopped), i.e., as more oil can be retained in the oil reservoir chamber 123, the tensioner can operate smoothly even immediately after the start up after being left for a long time.

<Embodiment 2>

Figure 10:
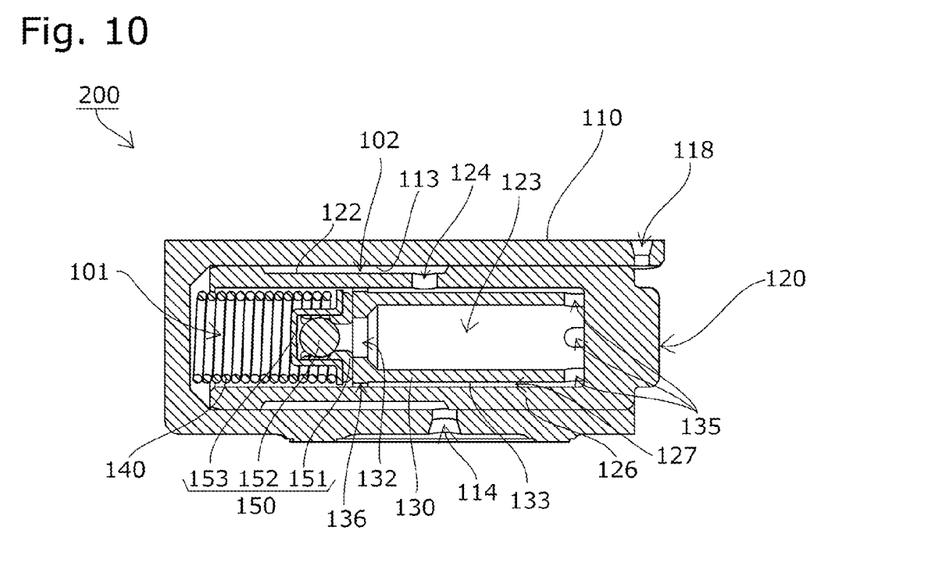
FIG. 10 is a cross-sectional view of the chain tensioner according to a second embodiment of the present invention (section along B-B of FIG. 2)
Figure 11:
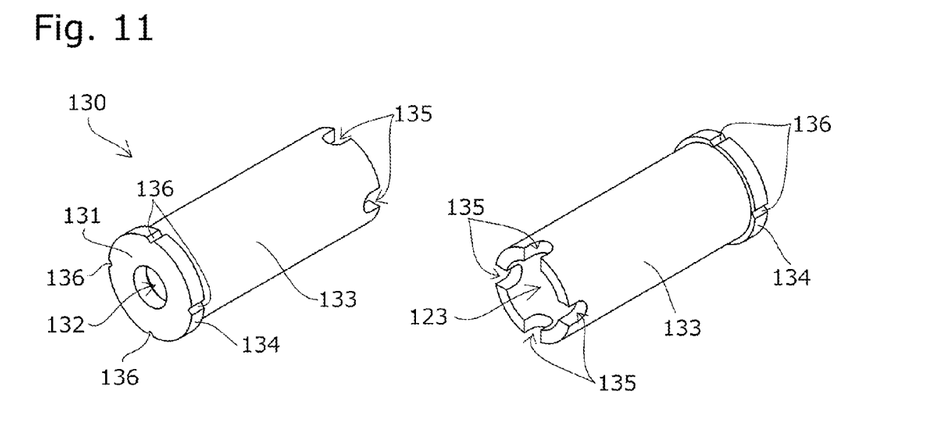
FIG. 11 is a perspective view of a reserve tube of the chain tensioner according to the second embodiment of the present invention.

The chain tensioner 200 according to a second embodiment of the present invention does not include an outer leak groove in the outer circumference of the plunger body 126 on the oil pressure chamber 101 side, but instead includes inner leak grooves 136 in the large-diameter part 134 of the reserve tube 130 as shown in FIG. 10 and FIG. 11, as compared to the chain tensioner 100 according to the previously described first embodiment (reference numerals in the drawings are the same as those of the first embodiment).

In this embodiment, the reserve tube 130 is formed with inner leak grooves 136 at four positions of the large-diameter part 134 as shown in FIG. 11, so that oil can flow from the oil pressure chamber 101 through the inner leak grooves 136 into the internal supply cavity 127.

No leak grooves are formed in the outer circumference on the oil pressure chamber 101 side of the plunger body 126.

The chain tensioner is configured the same in other respects as the chain tensioner 100 according to the previously described first embodiment.

The chain tensioner 200 according to the second embodiment of the present invention configured as described above works in normal operation similarly to the chain tensioner 100 according to the previously described first embodiment.

One difference from the chain tensioner 100 of the first embodiment is how the oil flows immediately after the start-up after being left for a long time after the stop of the oil supply (in the case with an engine, after the engine was stopped).

Since the flow resistance of oil leaking through the inner leak grooves 136 into the internal supply cavity 127 is smaller than the flow resistance of oil flowing from the oil pressure chamber 101 through the gap between the plunger body 126 and the cylindrical surface 113 of the plunger bore 111 into the supply chamber 102, when the plunger 120 is pushed inwards, most oil flows through the inner leak grooves 136 into the internal supply cavity 127, and is recovered into the oil reservoir chamber 123 through the oil communication notches 135.

The amount of oil leaking to the outside is thus reduced, so that the oil reservoir chamber 123 can have a smaller capacity to hold a sufficient and necessary amount of oil during the time lag before oil is supplied at the restart.

While the inner leak grooves 136 are provided at four positions in the large-diameter part 134 in the embodiment above, the grooves may be provided at three or less positions, or five or more positions.

<Embodiment 3>

Figure 12:
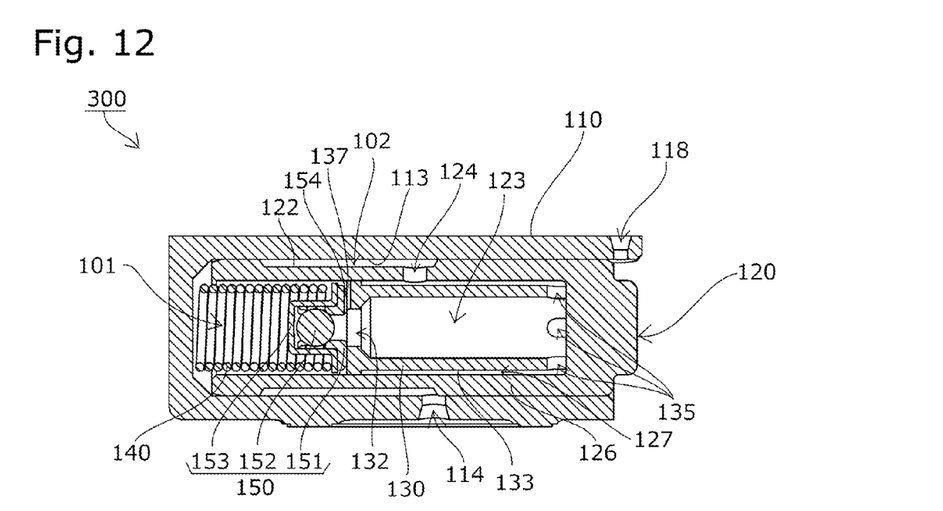
FIG. 12 is a cross-sectional view of the chain tensioner according to a third embodiment of the present invention (section along B-B of FIG. 2)
Figure 13A:
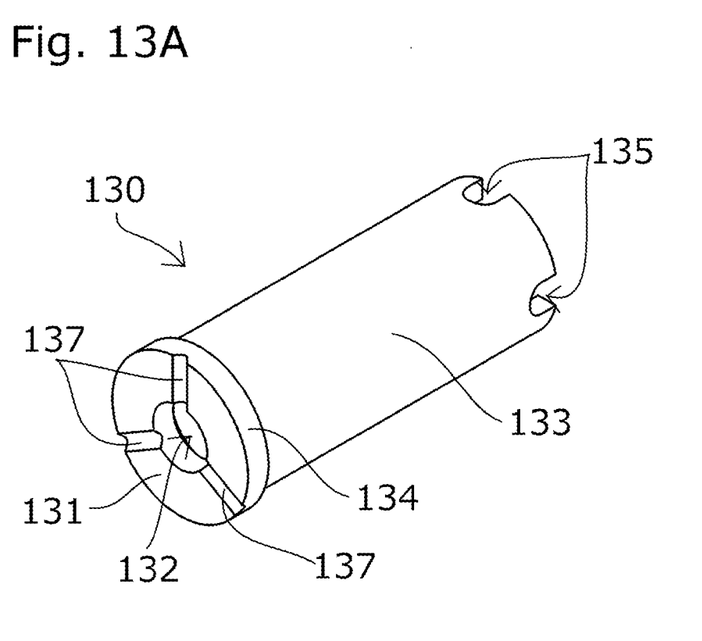
FIG. 13A is a perspective view of a reserve tube of the chain tensioner according to the third embodiment of the present invention.
Figure 13B:
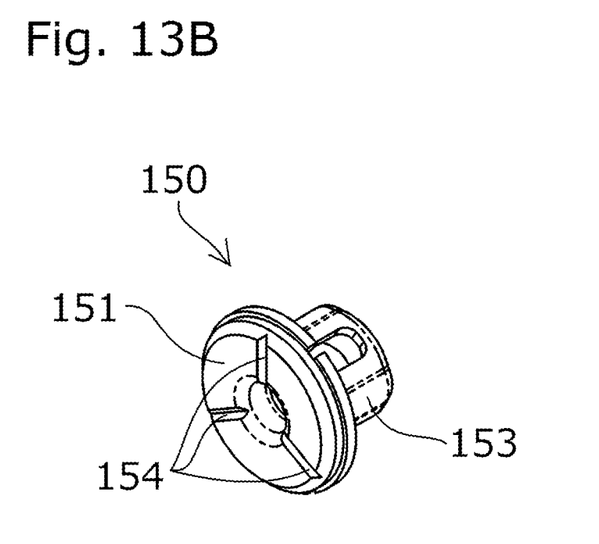
FIG. 13B is a perspective view of a ball seat of the chain tensioner according to the third embodiment of the present invention.

The chain tensioner 300 according to a third embodiment of the present invention does not include an outer leak groove in the outer circumference of the plunger body 126 on the oil pressure chamber 101 side, but instead includes end face leak grooves 137 and seat leak grooves 154 in the end face 131 of the reserve tube 130 and in the surface on the reserve tube 130 side of the ball seat 151, respectively, as shown in FIG. 12, FIG. 13A, and FIG. 13B, as compared to the chain tensioner 200 according to the previously described second embodiment (reference numerals in the drawings are the same as those of the first embodiment).

In this embodiment, the reserve tube 130 is formed with end face leak grooves 137 at three radial positions in the end face 131, which extend from the outer circumference to the oil hole 132, as shown in FIG. 13A, and with seat leak grooves 154 at three radial positions similarly in the surface on the reserve tube 130 side of the ball seat 151, as shown in FIG. 13B.

The end face leak grooves 137 and the seat leak grooves 154 are positioned opposite each other as shown in FIG. 12 so that oil can flow from the oil pressure chamber 101 through the end face leak grooves 137 and the seat leak grooves 154 into the internal supply cavity 127.

No leak grooves are formed in the outer circumference on the oil pressure chamber 101 side of the plunger body 126.

The chain tensioner is configured the same in other respects as the chain tensioner 100 according to the previously described first embodiment.

The chain tensioner 300 according to the third embodiment of the present invention configured as described above works in normal operation similarly to the chain tensioner 100 according to the previously described first embodiment.

The oil flow immediately after the start-up after being left for a long time after the stop of the oil supply (in the case with an engine, after the engine was stopped) is different from that in the chain tensioner 100 of the first embodiment, and the same as that in the chain tensioner 200 of the second embodiment.

Since the flow resistance of oil leaking through the end face leak grooves 137 and the seat leak grooves 154 into the internal supply cavity 127 is smaller than the flow resistance of oil flowing from the oil pressure chamber 101 through the gap between the plunger body 126 and the cylindrical surface 113 of the plunger bore 111 into the supply chamber 102, when the plunger 120 is pushed inwards, most oil flows through the end face leak grooves 137 and the seat leak grooves 154 into the internal supply cavity 127, and is recovered into the oil reservoir chamber 123 through the oil communication notches 135.

The amount of oil leaking to the outside is thus reduced, so that the oil reservoir chamber 123 can have a smaller capacity to hold a sufficient and necessary amount of oil during the time lag before oil is supplied at the restart.

While the end face leak grooves 137 and seat leak grooves 154 are both provided at three locations in the embodiment above, the grooves may be provided at two or less positions, or four or more positions.

While the end face leak grooves 137 and seat leak grooves 154 are positioned opposite each other, they need not necessarily face each other, and may be provided in different numbers if they are not opposite each other, or one of the end face leak grooves 137 and seat leak grooves 154 may be omitted.

<Embodiment 4>

Figure 14:
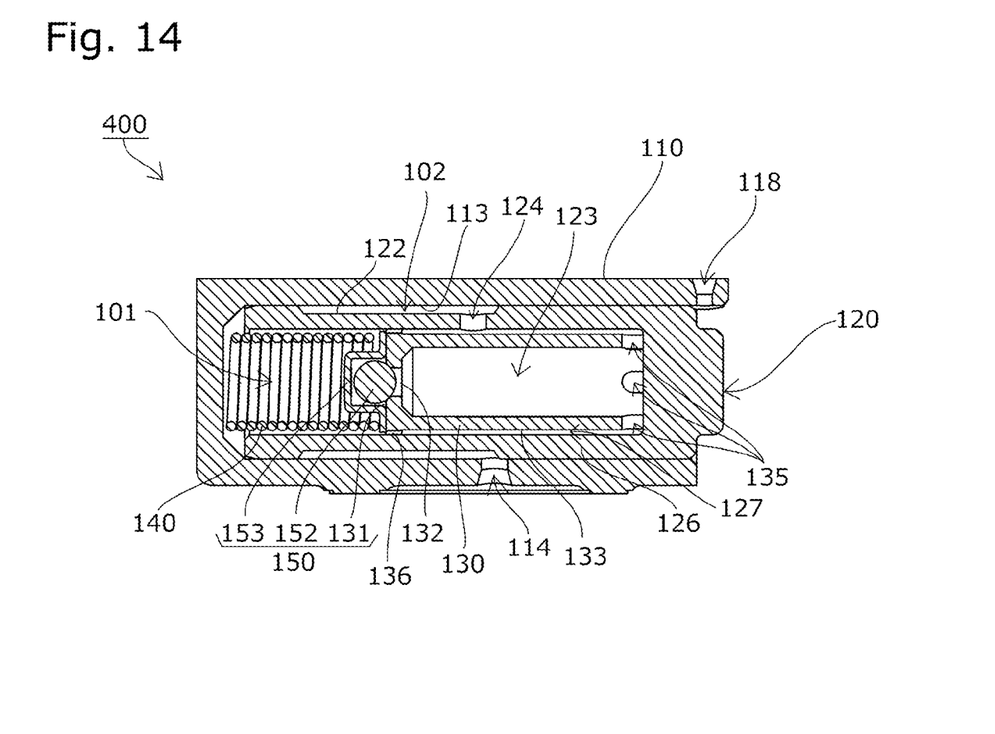
FIG. 14 is a cross-sectional view of the chain tensioner according to a fourth embodiment of the present invention (section along B-B of FIG. 2)

The chain tensioner 400 according to a fourth embodiment of the present invention does not have a ball seat 151 as compared to the chain tensioner 200 according to the previously described second embodiment, as shown in FIG. 14 (reference numerals in the drawing are the same as those of the second embodiment).

In this embodiment, the check ball 152 directly contacts the oil hole 132 in the end face 131 of the reserve tube 130, so that the end face functions as the ball seat.

With this embodiment, the number of components can be reduced to achieve a reduction in size and weight, and also, more oil can be retained by efficient use of space, as the oil reservoir chamber 123 is made larger by the thickness of the ball seat.

<Embodiment 5>

Figure 15:
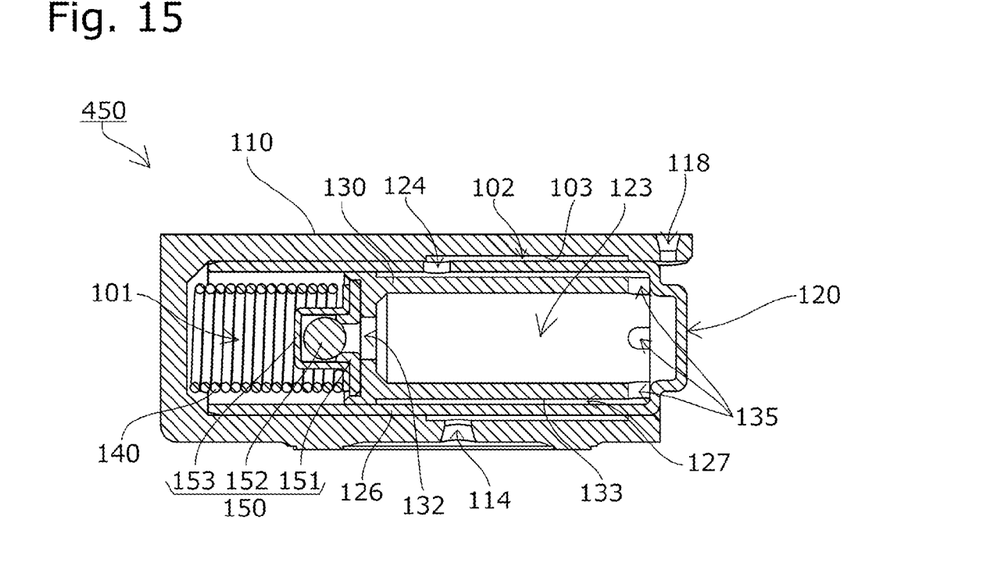
FIG. 15 is a cross-sectional view of the chain tensioner according to a fifth embodiment of the present invention (section along B-B of FIG. 2)

The chain tensioner 450 according to a fifth embodiment of the present invention has the connection/adjustment groove that forms the supply chamber 102 of oil in the inner circumference of the plunger bore as shown in FIG. 15, as compared to the chain tensioner 200 according to the previously described second embodiment (same elements and components are given the same reference numerals as those of the second embodiment. The inner leak grooves are not shown).

In this embodiment, a body-side connection/adjustment groove 103 is formed in the inner circumference of the plunger bore 111 of the tensioner body 110 to form the supply chamber 102 between the bore surface and the outer circumference of the plunger body 126.

With this embodiment, the plunger body 126 can have a smaller thickness to reduce its weight, as it has a cylindrical shape with flat surfaces both inside and outside without any protrusions or recesses as shown in FIG. 15, and as the plunger body 126 does not require much processing, it can be readily produced without a complex process, such as pressing or the like.

End face leak grooves 137 and seat leak grooves 154 similarly to the third embodiment may be provided instead of the inner leak grooves (not shown).

While specific examples of the chain tensioner according to the present invention have been described in the embodiments above, the chain tensioner according to the present invention is not limited to these examples, and the shapes, positions, sizes, and positional relationships with each other of various constituent parts may be changed in various manners.

For example, while the connection/adjustment groove 122 or the body-side connection/adjustment groove 103 extends all around in the embodiments described above so that the supply chamber 102 is tubular, the connection/adjustment groove 122 or the body-side connection/adjustment groove 103 may be formed only in part (in such a shape as, for example, the connection/adjustment groove 123 of Japanese Patent Publication No. 4376278 mentioned above), so that the supply chamber 102 does not extend all around, as long as oil can be supplied during normal operation and recovered into the oil reservoir chamber 123 at start-up.

The outer leak groove 125, inner leak grooves 136, end face leak grooves 137, and seat leak grooves 154 in various embodiments may have any cross-sectional shape, depth, circumferential width, and the like, which may be selected suitably in accordance with the environment of its application, as long as it serves the purpose of the present invention and works as described above.

Other components commonly included in a chain tensioner, such as a ratchet mechanism, may of course be added to the configurations of the embodiments described above.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided by the distal end of the plunger.

The chain tensioner may not necessarily be applied to a chain transmission mechanism but also used for similar transmission mechanisms that use belts, ropes and the like. The chain tensioner of the present invention, including a tensioner body having a cylindrical plunger bore with an open end, a cylindrical plunger slidable within the plunger bore, and an urging unit accommodated inside an oil pressure chamber formed between the plunger bore and a rear end of the plunger such as to be able to expand and contract and to urge the plunger outward, is applicable for use in various industrial fields where sufficient oil needs to be supplied at restart after a long time after the stop of oil supply.

What is claimed is:

1. A chain tensioner comprising: a tensioner body having a cylindrical plunger bore with an open end; a cylindrical plunger slidable within the plunger bore; and an urging unit accommodated inside an oil pressure chamber formed between the plunger bore and a rear end of the plunger such as to be able to expand and contract and to urge the plunger outward, the plunger including a plunger body, and a check valve and a reserve tube provided inside the plunger body, and the reserve tube having an oil hole provided on one side closer to the check valve and an oil reservoir chamber communicating with the oil pressure chamber through the oil hole, and a connection/adjustment groove formed at least in one of an outer circumferential surface of the plunger body and an inner circumferential surface of the plunger bore to form an oil supply chamber; an oil supply hole formed in the tensioner body, for supplying oil to the supply chamber; an internal supply cavity formed between an outer circumferential surface of a small-diameter part of the reserve tube and an inner circumferential surface of the plunger body; a plunger hole formed in the plunger body, for supplying oil from the supply chamber to the internal supply cavity; and an oil communication notch formed at a distal end in an outward direction of the plunger of the reserve tube, for supplying oil from the internal supply cavity to the oil reservoir chamber.

2. The chain tensioner according to claim 1, further comprising an outer leak groove formed in the outer circumferential surface of the plunger body on one side closer to the oil pressure chamber such as to extend from the oil pressure chamber to the supply chamber.

3. The chain tensioner according to claim 2, wherein the outer leak groove is located at a circumferentially same phase position as the plunger hole.

4. The chain tensioner according to claim 1, further comprising an inner leak groove formed in the outer circumferential surface of the reserve tube on one side closer to the check valve such as to extend from the oil pressure chamber to the internal supply cavity.

5. The chain tensioner according to claim 1, further comprising a contact surface leak groove formed in at least one of opposite surfaces of the reserve tube and the check valve such as to extend from the oil pressure chamber to the oil reservoir chamber.

6. The chain tensioner according to claim 1, wherein the urging unit includes a coil spring having one end seated on a bottom of the plunger bore and the other end seated in the plunger body.

7. The chain tensioner according to claim 6, wherein the check valve includes a ball seat, a check ball capable of making sealing contact with an oil passage in the ball seat, and a retainer that guides the check ball, the other end of the coil spring being seated on an outer flange of the retainer in the plunger body.

8. The chain tensioner according to claim 7, wherein the surface of the reserve tube on one side closer to the check valve functions as the ball seat of the check valve.

9. The chain tensioner according to claim 6, wherein the bottom of the plunger bore is formed as a circular flat surface with a same diameter as the coil spring, and has a tapered surface that connects the bottom with the cylindrical surface sliding with the plunger.

* * * * *